April 5, 1927.  E. R. BURTNETT  1,623,386
INTERNAL COMBUSTION ENGINE
Filed Sept. 18, 1924
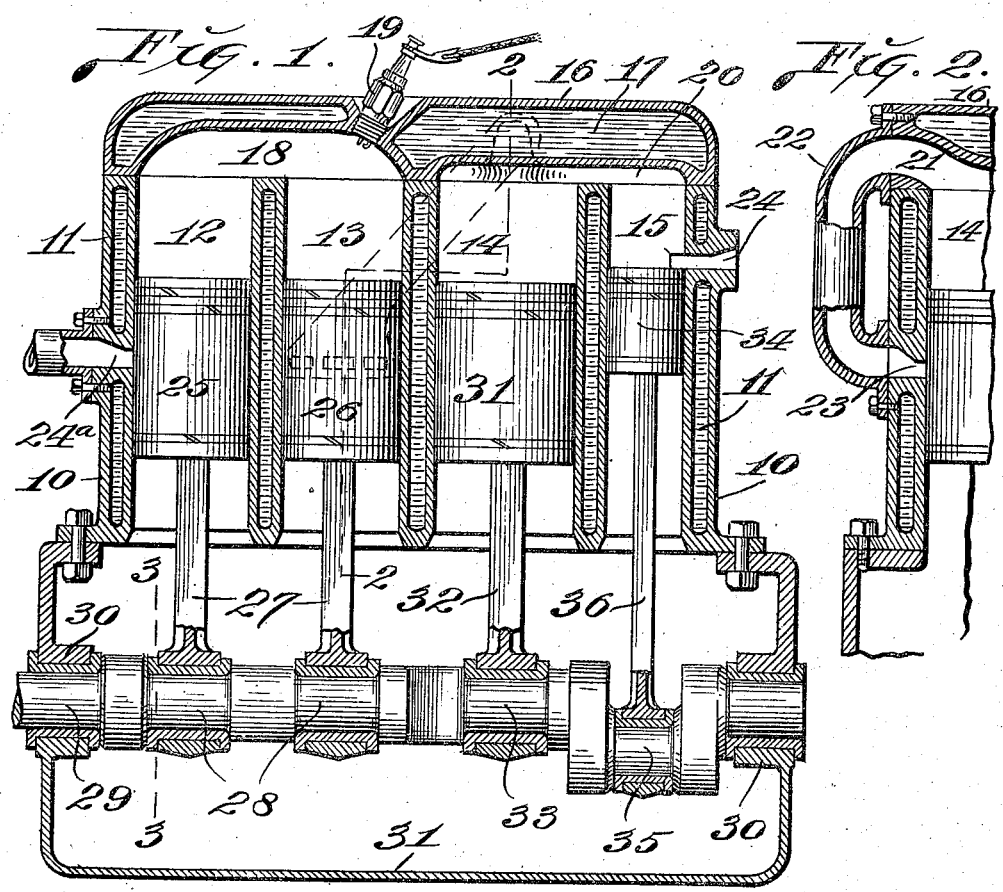
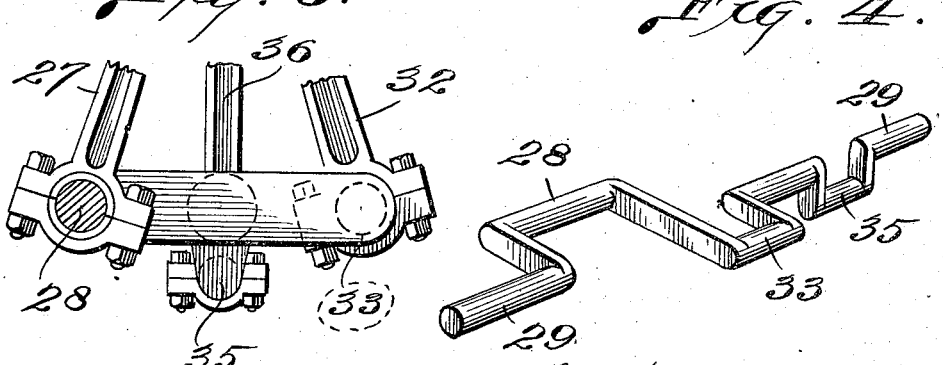
Inventor:—
Everett R. Burtnett.
By Martin C. Smith, atty.

Patented Apr. 5, 1927.

1,623,386

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed September 18, 1924. Serial No. 738,417.

My invention relates to internal combustion engines of the general type disclosed in my co-pending application for U. S. Letters Patent filed January 4, 1923, Serial No. 610,700.

The principal object of my present invention is to generally improve upon and simplify the construction of the invention disclosed in my application aforesaid and to provide an engine of the two-stroke cycle type that will produce a relatively high degree of efficiency with relatively low cost of operation.

Further objects of my invention are to provide an engine of the character described wherein a pair of combustion chambers are connected at their outer or upper ends by a common combustion and expansion chamber; to arrange behind and in line with the combustion chambers a gaseous fuel pumping cylinder; to arrange behind and in line with said pumping cylinder and said combustion cylinders a cylinder and a piston valve therein which piston valve controls the admission of gaseous fuel into the piston valve chamber and pumping cylinder and to connect the pistons of the combustion cylinders, the pumping cylinder and valve cylinder to a common crank shaft which latter is the main crank shaft of the engine.

With the foregoing and other objects in view, my invention consists in certain novel features of construction and arrangement of parts that will be hereinafter more fully described and claimed and illustrated in the accompanying drawings, wherein—

Figure 1 is a vertical longitudinal section taken lengthwise through the center of an engine of my improved construction;

Figure 2 is a detail section taken approximately on the line 2—2 of Figure 1;

Figure 3 is a detail section taken approximately on the line 3—3 of Figure 1;

Figure 4 is a perspective view of the crank shaft employed in my improved engine.

Referring by numerals to the accompanying drawings, which illustrate a practical embodiment of my invention, 10 designates a cylinder block which is preferably cast in a single piece and the walls of which are provided with connected chambers 11 through which may be circulated a fluid-cooling medium such as water for the purpose of disseminating the heat generated during operation of the engine.

Formed in the forward portion of the block is a pair of combined combustion and expansion chambers 12 and 13, the axes of which are arranged substantially parallel with each other, the chamber 13 being preferably directly behind and in line with chamber 12. Formed in the block to the rear of and behind chamber 13 is a gaseous fuel pumping chamber 14, and formed in the rear portion of the block preferably behind said chamber 14 is a piston valve chamber 15 of relatively small diameter. The axes of chambers 14 and 15 are preferably parallel with each other and they are also preferably in line with or in the same plane with the axes of combustion chambers 12 and 13.

Arranged on the upper or outer end of the block 10 is a head 16 provided with connected chambers 17 through which may be circulated a fluid-cooling medium and formed in the under side of the forward portion of this head is a recess 18 that connects the combustion chambers 12 and 13 and provides a common combustion and expansion chamber.

Seated in head 16, preferably above the combustion chamber 13, is an ignition device such as a spark plug 19 and the terminals of the electrodes thereof project into the common clearance chamber 18. Formed in the under side of the rear portion of head 16 is a relatively shallow recess 20 that provides communication between the chambers 14 and 15, and leading from this chamber above the pumping chamber 14 through the side of head 16 is a short duct 21, the outer end of which communicates with the upper end of an inclined tubular member 22.

The lower end of this tubular member communicates directly with a series of inlet ports 23 that are formed through the wall of block 10 and which communicate with the intermediate portion of combustion chamber 13. These ports 23 are arranged so that they are fully uncovered and open when the piston within chamber 13 is at the lower or inner end of its stroke.

Formed through the wall of block 10 and communicating with the upper portion of the valve chamber 15 is a gaseous fuel inlet port 24 that is located so that it is fully uncovered and open only when the piston valve is at the lower or inner end of its stroke.

Formed through the wall of block 10 and communicating with the intermediate portion of chamber 12 is an exhaust port 24ª that is arranged so that it is wholly uncovered and open only when the piston in said chamber 12 is at the lower or inner end of its stroke.

Pistons 25 and 26 are arranged for operation, respectively, in combustion chambers 12 and 13, and said pistons are connected by ordinary connecting rods 27 with one of the throws or cranks 28 of a crank shaft 29. This crank shaft is arranged for operation in suitable bearings 30 that are formed in the ends of a crank case 31 which latter is connected to and arranged below cylinder block 10.

A pumping piston 31 is arranged for operation within chamber 14 and said piston is connected in the usual manner by a connecting rod 32 to a crank 33 on crank shaft 29, which crank 33 is disposed directly opposite or approximately 180° from crank 28. A piston valve 34 is arranged for reciprocatory movement within chamber 15 and connecting said piston valve to a crank 35 on crank shaft 29 is a connecting rod 36. Crank 35 is preferably shorter than the cranks 28 and 33, and said crank 35 is arranged approximately 90° in advance of crank 33 in the direction of crank shaft rotation.

The operation of my improved engine is as follows: As piston valve 34 approaches and passes low center and while in the position illustrated in Figure 1, gaseous fuel inlet port 24 is opened, thereby admitting to the connected chambers 14 and 15 a charge of gaseous fuel.

While the piston valve is at its low center the pumping piston 31 is approximately at a half-way point on its downward or outward stroke, due to the position of crank 33, while the power pistons 25 and 26 are at the half-way point on their upward strokes due to the relative position of crank 28. During the upward travel of pistons 25 and 26, a volume of residual products of combustion and a charge of gaseous fuel previously admitted to chamber 13 through ports 23 will be compressed in the upper portions of said chambers 12 and 13, and within recess 18, and as said pistons pass high center or immediately thereafter the compressed charge will be ignited as a result of a spark produced between the terminals of the electrodes of spark plug 19, thereby producing a relatively high degree of expansion and forcing the pistons downward on their power stroke.

As the power pistons approach and pass their low or outer centers, exhaust port 24ª will be uncovered, thereby permitting the greater portion of the products of combustion to discharge from the chambers 12 and 13, and this scavenging action is accelerated by the inlet of a compressed gaseous fuel charge through inlet ports 23 that are uncovered when piston 26 reaches its low center. As pistons 25 and 26 start upward on the charge compression stroke, the ports 23 and 24ª will be closed and the combined charge of residual products of combustion and gaseous fuel would be compressed as said pistons travel upward in the respective chambers 12 and 13. The charge of gaseous fuel admitted to piston valve chamber 15 through port 24 enters while pumping piston 31 is moving downward through the latter portion of its outward or downward stroke, and as said pumping piston moves upward of inward this charge of gaseous fuel will be compressed in the upper portions of the chambers 14 and 15, the recess 20 and the duct 22, but this charge of compressed fuel cannot enter chamber 13 until the piston 26 therein reaches the end of its outer or downward stroke.

Thus it will be seen that I have provided a two-stroke cycle internal combustion engine that is of relatively simple structure, capable of being easily and cheaply produced and which may be very economically operated in point of fuel consumption. The four cylinders and their pistons occupy approximately the same plane and all of the pistons are directly connected to a common crank shaft. One of the particular advantages of my improved construction is the provision of a piston valve for controlling the admission of gaseous fuel to the pumping chamber which piston is actuated directly from the crank shaft of the engine.

Obviously, the details of construction of my improved internal combustion engine may be varied somewhat from those herein shown and described without departure from the spirit of my invention, the scope of which will appear from the appended claim.

I claim as my invention:

In a two stroke cycle internal combustion engine, a cycle having a pair of combustion cylinders, a pumping cylinder and a piston valve cylinder, pistons arranged for operation within the combustion cylinders and pumping cylinder, a piston valve arranged for operation within the piston valve cylinder, the pair of combustion cylinder chambers being joined at the head end by a common compression and combustion clearance chamber, the pumping cylinder chamber and the piston valve cylinder chamber being joined by a common compression clearance chamber, a transfer duct extending from the clearance chamber of the pumping and piston valve cylinder to ports formed in the intermediate portion of one of the pair of combustion cylinders, the axis of all of the cylinders being substantially parallel and arranged in a row with the axis of the crank shaft, a three throw crank shaft, the said three throws being arranged in different axial planes circumferentially, the two pistons within the pair of combustion cylinders being separately connected to one of the crank throws of said three crank throw shaft, the piston within the pumping cylinder being connected to a second crank throw of said three throw crank shaft, the piston valve within the valve cylinder, being connected to the third crank throw of the said three crank throw crank shaft, the degree of angularity between the crank to which the two combustion cylinder pistons are connected and the crank to which the piston of the pumping cylinder is connected, being such, as to cause the piston within the pump cylinder to reach compression dead center as the piston within the combustion cylinder in which the inlet ports of the transfer duct are formed, has closed the said inlet ports and the crank to which the piston valve is connected, being spaced circumferentially in degrees in relation to the crank to which the piston within the pumping cylinder is connected so as to cause the inlet function by the said piston valve to the said pumping cylinder, to be effected during the entire period of the suction stroke of the pumping piston with the desired lag in valve closing timing.

In testimony whereof I affix my signature.

EVERETT R. BURTNETT.